US009376320B1

(12) United States Patent
Sandu

(10) Patent No.: US 9,376,320 B1
(45) Date of Patent: Jun. 28, 2016

(54) METHOD OF MANUFACTURING CARBON NANOTUBES AND FIBERS USING CATALYTIC MAGNESIUM OXIDE NANOPARTICLES

(71) Applicant: Baker Hughes Incorporated, Houston, TX (US)

(72) Inventor: Corina L. Sandu, Pearland, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/566,992

(22) Filed: Dec. 11, 2014

(51) Int. Cl.
*D01F 9/12* (2006.01)
*D01F 9/145* (2006.01)
*C01B 31/02* (2006.01)

(52) U.S. Cl.
CPC .................................. *C01B 31/0226* (2013.01)

(58) Field of Classification Search
CPC ............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04
USPC ........ 423/447.1–447.3, 445 B; 977/742–754, 977/842–848
See application file for complete search history.

(56) References Cited

U.S. PATENT DOCUMENTS

| 2005/0079119 | A1 | 4/2005 | Kawakami et al. |
| 2006/0251568 | A1 | 11/2006 | Fahlman |
| 2007/0160522 | A1 | 7/2007 | Ryu et al. |

FOREIGN PATENT DOCUMENTS

| EP | 1 462 415 A2 | 9/2004 | |
| WO | WO 2015/101917 | * 7/2015 | ............. C01B 31/02 |

OTHER PUBLICATIONS

Kumar, et al., Chemical Vapor Deposition of Carbon Nanotubes: A Review on Growth Mechanism and Mass Production, Journal of Nanoscience and Nanotechnology 2010; 10: 3739-3758.*
Xiong, et al., Aligned millimeter-long carbon nanotube arrays grown on single crystal magnesia, Carbon 2006; 44: 969-973.*
"Sparging," accessed online at: https://en.wikipedia.org/wiki/Sparging_(chemistry) on Feb. 18, 2016.*
Steiner, III, S.A., et al., "Nanoscale Zirconia as a Nonmetallic Catalyst for Graphitization of Carbon and Growth of Single- and Multiwall Carbon Nanotubes," J. Am. Chem. Soc. 131, 12144-12154 (2009).
Jeong, Soo-Hwan et al., "A Sonochemical Route to Single-Walled Carbon Nanotubes Under Ambient Conditions," Jnl of American Chemical Society, vol. 126, pp. 15982-15983 (2004).
Int'l Search Report & Written Opinion in PCT/US2015/063497, dtd Mar. 11, 2016.

* cited by examiner

*Primary Examiner* — Daniel C McCracken
(74) *Attorney, Agent, or Firm* — Mossman Kumar & Tyler PC

(57) ABSTRACT

A method for producing carbon nanotubes and/or fibers, such as carbon nano-tubes, involves sparging a gas (such as carbon dioxide) through a liquid hydrocarbon (such as crude oil) in the presence of an effective amount of magnesium oxide (MgO) particles (such as MgO nanoparticles having a size in the range from about 2 nm to about 10 microns, and which may have a bimodal particle size distribution) at a temperature in a range of between about 70 to about 90° C. to produce carbon nanotubes and fibers having a size range of from about 50 nm to about 20 microns.

19 Claims, 3 Drawing Sheets

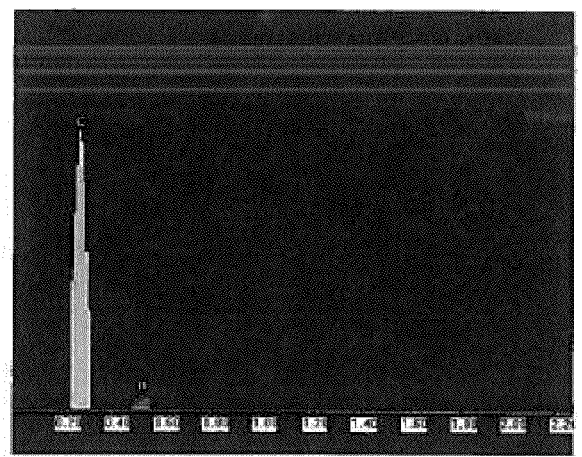
FIG. 8
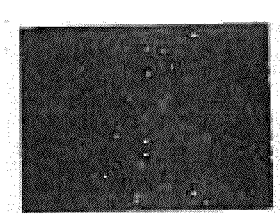 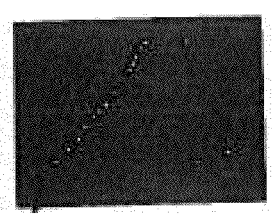 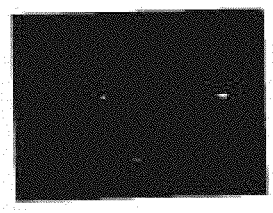 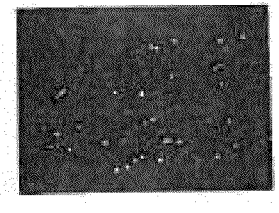
FIG. 9    FIG. 10    FIG. 11    FIG. 12

METHOD OF MANUFACTURING CARBON NANOTUBES AND FIBERS USING CATALYTIC MAGNESIUM OXIDE NANOPARTICLES

TECHNICAL FIELD

The invention relates to a method for producing carbon nanotubes and/or fibers, including but not limited to, carbon nanotubes, and more particularly rates to methods for producing carbon nanotubes and/or fibers directly from liquid hydrocarbons.

BACKGROUND

Carbon nanotubes (abbreviated as "CNTs") are allotropes of carbon with a cylindrical nanostructure. CNTs have been made with a length-to-diameter ratio of up to 132,000,000:1—a significantly larger ratio than for any other material. Cylindrical carbon nanotubes are known to have unusual properties which are valuable for electronics, optics, nanotechnology in general and other fields, such as materials science. CNTs have several applications in the oilfield, as well as in other industries such as the military, aerospace, and energy. Due to their extraordinary thermal conductivity and mechanical and electrical properties, CNTs find applications as additives to various structural materials. In non-limiting embodiments, nanotubes form a very small portion of the material(s) in some carbon fiber golf clubs, baseball bats, car parts and steel.

Techniques developed for producing carbon nanotubes in sizable quantities include arc discharge, laser ablation, high-pressure carbon monoxide disproportionation and chemical vapor deposition (CVD). Most of these processes require a vacuum or involve process gases. CVD growth of CNTs can occur in vacuum or at atmospheric pressure.

Arc discharge produces CNTs in the carbon soot of graphite electrodes, such as by using a current of 100 amps. The carbon in the negative electrode sublimates because of the high-discharge temperatures. The yield for this method may be up to 30 wt %, and it produces both single- and multi-walled nanotubes with lengths of up to 50 micrometers with few structural defects.

In laser ablation, a pulsed laser vaporizes a graphite target in a high-temperature reactor while an inert gas is bled into the chamber. Nanotubes develop on the cooler surfaces of the reactor as the vaporized carbon condenses. Watercooled surfaces may be included in the system to collect the nanotubes. Good yields have been obtained by aiming the laser at composite and metal catalyst particles, such as cobalt and nickel mixture, to synthesize single-walled carbon nanotubes. The laser ablation method may produce yields around 70% and produce single-walled carbon nanotubes with a controllable diameter determined by the reaction temperature. However, this method is more expensive than either arc discharge or CVD.

Single-walled carbon nanotubes may also be synthesized by thermal plasma methods. The goal is to reproduce the conditions prevailing in the arc discharge and laser ablation methods, but a carbon-containing gas is used instead of graphite vapors to supply the carbon necessary for the production of single-walled nanotubes (SWNTs). It is continuous and relatively low cost. In a continuous process, a gas mixture composed of argon, ethylene, and ferrocene is introduced into a microwave plasma torch, where it is atomized by the atmospheric pressure plasma, which has the form of an intense "flame". The fumes created by the flame contain SWNTs, metallic and carbon nanoparticles and amorphous carbon. The induction thermal plasma method can produce up to 2 grams of nanotube material per minute, which is a higher production rate than the arc-discharge or the laser ablation methods.

During CVD production of CNTs, a substrate is prepared with a layer of metal catalyst particles, commonly nickel, cobalt, iron or a combination of these. The metal nanoparticles may also be produced by other ways, including the reduction of oxides or oxide solid solutions. The diameters of the nanotubes that are grown are related to the size of the metal particles. This may be controlled by patterned (or masked) deposition of the metal, annealing, or by plasma etching of a metal layer. The substrate is heated to approximately 700° C. To initiate growth of nanotubes, two gases are bled into the reactor: a process gas, such as ammonia, nitrogen or hydrogen, and a carbon-containing gas, such as acetylene, ethylene, ethanol or methane. The nanotubes grow at the sites of the metal catalyst, the carbon-containing gas is broken apart at the surface of the catalyst particle, and the carbon is transported to the edges of the particle, where it forms the nano-tubes. CVD is the most widely used method for the production of carbon nanotubes and may show the promise for industrial-scale production.

S. Steiner III, et al. in "Nanoscale Zirconia as a Nonmetallic Catalyst for Graphitization of Carbon and Growth of Single- and Multiwall Carbon Nanotubes," *J. Am. Chem. Soc.*, 2009, Vol. 131 (34), pp. 12144-12154 report that nanoparticulate zirconia ($ZrO_2$) catalyzes both growth of single-wall and multiwall carbon nanotubes (CNTs) by thermal chemical vapor deposition (CVD) and graphitization of solid amorphous carbon. They observed that silica-, silicon nitride-, and alumina-supported zirconia on silicon nucleates single- and multiwall carbon nanotubes upon exposure to hydrocarbons at moderate temperatures (750° C.).

However, it would be desirable if a method were discovered to produce carbon nanotubes that is simpler and less expensive than current methods.

SUMMARY

There is provided, in one form, a method for producing carbon nanotubes and/or carbon fibers that includes sparging a gas through a liquid hydrocarbon in the presence of an effective amount of magnesium oxide particles at a temperature in a range of between about 70 to about 90° C. to produce carbon nanotubes and/or carbon fibers.

BRIEF DESCRIPTION OF THE DRAWINGS

FIG. 8 is EDX data on the carbon fibers showing the elements present on the sample: Mg, C, O, and some S; and FIGS. 9, 10, 11 and 12 are optical images of the results of the production of carbon nanotubes from Example C.

DETAILED DESCRIPTION

Figure 1:
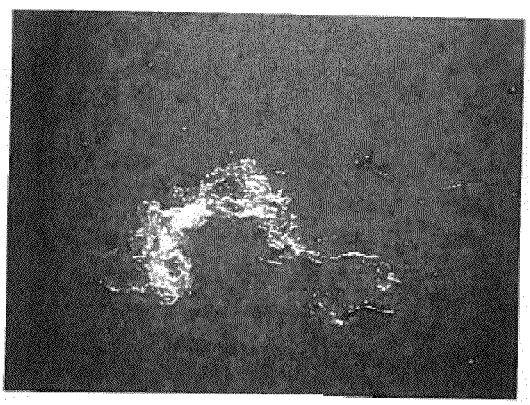
FIGS. 1, 2, 4, 5, 6 and 7 are microphotographs of the results of the production of carbon nanotubes from Example A.
Figure 2:
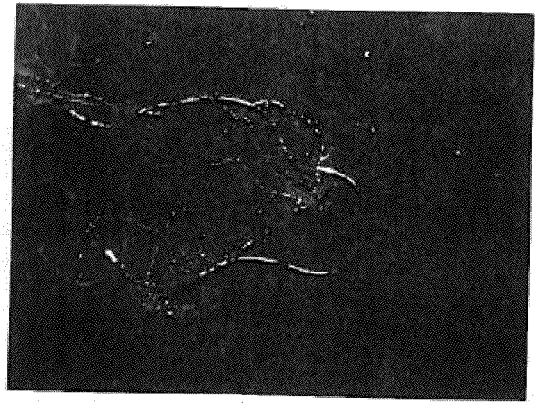

While attempting to produce something else, a chemical method of making carbon nanotubes (fibers) by using magnesium oxide (MgO) nanoparticles as a catalyst was discovered. Carbon nanotubes are usually made using a metal catalyst. In the new process, metal oxide nanoparticles, namely magnesium oxide (MgO), are used to make carbon nanotubes. The length, the size and the amount of the carbon nanotubes can be changed depending on reaction conditions, including, but not necessarily limited to, the sequence the reactants are added to the reaction, concentration of catalyst (amount of nanoparticles used) as well as the reaction time. The amount and size of the carbon nanotubes and carbon fibers can also be varied depending on the catalyst amount, reaction temperature, and the amount of gas sparged, for instance carbon dioxide ($CO_2$). The size of the tubes and fibers may also extend into the micron range. This new process of making carbon nanotubes can offer several applications in the oilfield, as well as other industries including, but not necessarily limited to, the military, aerospace and energy fields. As previously established, carbon nanotubes are well known for their multiple properties. This process may be achieved relatively easily and inexpensively. It should be noted that the terms "carbon nanotubes" and carbon "fibers" are used interchangeably herein since one or the other or both may be produced by the method described. Further, the method may also produce micron-sized carbon tubes and/or fibers; where "micron-sized" is defined as ranging from about one micron to about 1000 microns; alternatively from about one micron to about 100 microns. Collectively, these sizes are known as "carbon tubes and/or fibers".

Briefly the method involves, in one non-limiting embodiment, making carbon nanotubes by sparging crude oil with $CO_2$ at a temperature of 70-90° C. in the presence of MgO nanoparticles, where the sizes and widths of the nanotubes may be changed as a function of the experimental conditions. The MgO nanoparticles were discovered to be functioning as a catalyst to form nano- and micro-fibers.

While the method is known to be effective when sparging carbon dioxide ($CO_2$) through the liquid hydrocarbon, other suitable gases include, but are not necessarily limited to, inert gases, such as, but not limited to noble gases including argon, or mixtures of inert gases such as argon mixed with $CO_2$. The amount of gas sparged through the liquid hydrocarbon based on the liquid hydrocarbon ranges from about 0.1 independently to about 10 volume %; in another non-limiting version from about 0.5 independently to about 5 volume %; alternatively from about 1 independently to about 4 volume %. The word "independently" when used herein with respect to a range means that any lower threshold may be combined with any upper threshold to form a suitable alternative range.

Suitable liquid hydrocarbons through which the gas is sparged include, but are not necessarily limited to, crude oil, or any hydrocarbon phase that has a limited amount of water present (less than 0.1%), and combinations thereof. Crude oil is particularly suitable. It is expected that under the proper conditions, about any hydrocarbon phase may produce carbon nanotubes and carbon nanofibers. The MgO particles may be added in the form of a colloidal hydrocarbon-based overbase; thus it is expected that if the MgO particles are mixed well with the hydrocarbon phase that the reaction described herein will proceed. The presence of large amounts of water and a larger concentration of asphaltenes may impede the amount of and type of fibers or nanotubes produced. Thus, it is expected that a lower asphaltene content hydrocarbon, such as light oil, or any petroleum based feeds with less AS % and less water may be more suitable as a hydrocarbon feedstock.

Suitable temperature ranges for the method include from about 70° C. independently to about 90° C.; alternatively from about 80° C. independently to about 90° C. or in a different non-limiting version from about 70° C. independently to about 80° C. The method may be conducted under pressure or under vacuum or at atmospheric pressure. In one non-limiting embodiment, if pressure is present, it should be small; for instance in the range of 10-50 psi (69-344 kPa).

The size range of the MgO particles may range from about 2 nanometers independently to about 50 microns in average particle size; alternatively from about 10 nanometers independently to about 900 nanometers in average particle size, and in a different non-restrictive version from about 20 nm independently to about 90 nm, and further in a non-limiting the size range of the MgO particles ranges from about 50 nm independently to about 1 micron, even up to about 5 microns, even up to about 10 microns. Another alternate size range may be from about 90 nm independently to 5 microns; where a different suitable size range is from about 100 nm independently to about 950 microns. It will also be appreciated that the MgO particles may have a bimodal particle size distribution. In one non-limiting embodiment, more than half (greater than 50 wt %) of the particles will have an average particle size of about 150 nm or less; alternatively about 90 nm or less and in another non-limiting embodiment about 70 nm or less, where at least about 20 wt % of the particles will have an average particle size of about 5 microns or more, alternatively 1 micron or more, and in a different non-limiting embodiment 750 nm or more. In another non-limiting embodiment, the magnesium oxide particles have an average particle size between about 90 nm to about 5 microns, where the amount of the magnesium oxide particles of a size less than 1000 nm is more than the amount of magnesium oxide particles of a size of 1 micron or greater. The proportion of MgO particles may range from about 10 independently to about 500,000 ppm by weight; alternatively from about 50 independently to about 1000 ppm, even up to about 5 wt % or even 10 wt %. Other alkaline earth metal oxides may function as catalysts in this method. While not necessarily being limited to any particular mechanism or explanation, it is believed that the alkaline metal oxide (e.g. MgO) particles may act as a catalyst in the production of the CNTs.

It has also been discovered that the sizes and widths of the carbon nanotubes and fibers produced by this method may range from about 50 nm to about 20 microns; in a non-limiting embodiment from about 100 nm independently to about 10 microns; alternatively from about 200 nm independently to about micron; and in a different non-restrictive version from about 300 nm independently to about 800 nm; alternatively the upper threshold may be less than 1000 nm. It is expected that the production of carbon nanotubes and/or fibers in a narrower size distribution and/or of a smaller size range may be accomplished with optimization of the method.

When the word "about" is used with respect to a parameter such as size, or proportion, or the like, in one non-limiting embodiment the parameter ranges from ±5% of the value; alternatively from ±2% of the value.

The method for producing carbon nanotubes and/or carbon fibers will now be described with respect to certain examples and data which are intended only to further illustrate the method and not to limit it in any way.

Examples A and B

The following Examples were conducted. Sample A was prepared by mixing 150 ppm of Catalyst X into 45 ml of crude oil. The sample was continuously heated at 70-80° C. and bubbled with $CO_2$ for 30 minutes. After that, the sample was filtered and dried. The weight of the sample was measured and recorded. B stands for the weight of the weighing tray used. B+F is the combined weight of weighing tray and blank filter paper (0.45 micron in diameter). B+F+S stands for the mass of weighing tray, filter and filtered sample obtained. The difference Δ shows the mass of the sample. Catalyst X is a MgO overbase that is 20% active as MgO; typically the nanoparticles are present in the range of 90-100 nm, but there are also larger particle aggregates present in a size up to 5 microns.

| Example A | B     | 1.1348 g | B + F+ S = 1.3229 g |
|           | B + F | 1.2059 g | $\Delta_A$ = 0.117 g |

45 cc of a particular crude oil at 70° C. were mixed with 250 ppm Catalyst X at 70-80° C. under continuous heating and $CO_2$ bubbling for 30 minutes.

| Example B | B     | 1.1404 g | B + F + S = 1.3398 g |
|           | B + F | 1.2115 g | $\Delta_B$ = 0.1283 g |

45 cc of crude oil at 70° C. were mixed with 2 mL Catalyst X at 70°-80° C. under continuous heating and $CO_2$ bubbling for 30 minutes.

Figure 3:
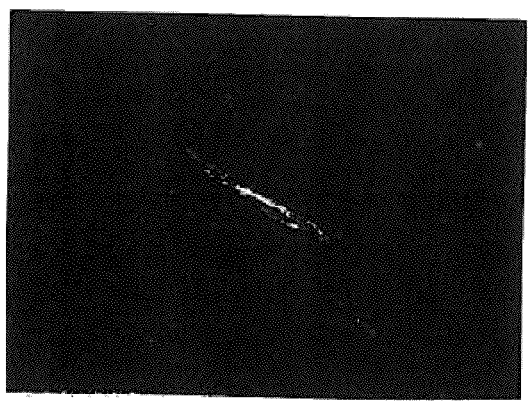
FIG. 3 is an optical image of the results of the production of carbon nano-tubes (fibers) from Example B.
Figure 4:
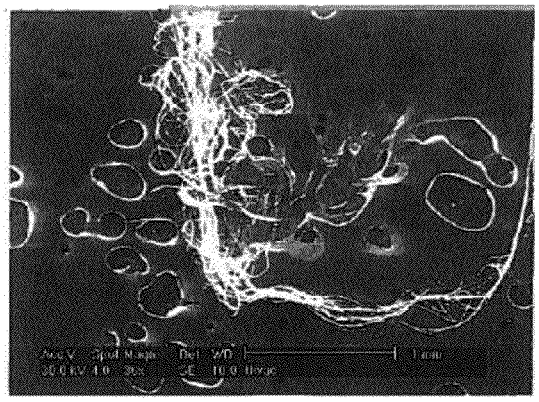
Figure 5:
Figure 6:
Figure 7:
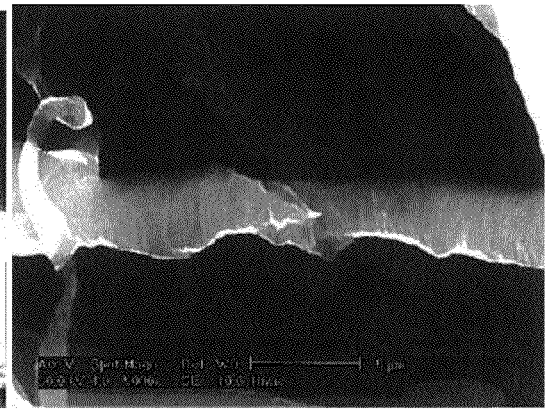

In both samples, the formation of tubes on the surface of the filter paper were observed that have the tendency to bubble and form clusters of fibers. Optical images of both samples were taken to have better vision of what is on the surface. Images for Example A are shown in FIGS. 1, 2, 4, 5, 6 and 7; images for Example B are shown in FIG. 3. The Example B sample had a higher density of fibers but their sizes were smaller. Sample A had a large bundle of fibers connected with smaller ones. Enough of each sample was present to run a SEM (scanning electron microscope). FIG. 8 presents EDX data on the carbon fibers showing the element present on the sample: Mg, C, O, and some S.

From the photographs of the results of Example A in FIGS. 4, 5, 6 and 7 it appears that carbon nanofibers were formed that have MgO particles on their surfaces. XPS measurements were also attempted on the fibers, but the signal was poor due to the very small amount of the sample. No magnesium was observed in the XPS.

Example C

Sample C of the same crude oil used in Examples A and B (55 cc) was prepared and $CO_2$ was bubbled through it for 30 minutes at 80° C.; 1 ml of KI-200 (~150 ppm) was added to the crude oil and permitted to react for another 30 minutes. Microphotograph optical images were taken (FIGS. 9, 10, 11 and 12) and it was observed that no bundles were formed on the surfaces, but fibers were easily identified (see FIG. 12). Their length was much shorter than the ones observed for Example A. Example C shows that regardless of the order of mixing, carbon nanofibers are still formed. FIGS. 9, 10, 11 and 12 are optical images of the results of the production of carbon nanotubes from Example C.

| Example C | B     | 1.1348 g | B + F+ S = 1.3295 g |
|           | B + F | 1.2051 g | $\Delta_S$ = 0.1244 g |

Many modifications may be made in the process of this invention without departing from the scope thereof that is defined only in the appended claims. For example, the exact nature of and proportions of gas, the liquid hydrocarbon, the alkaline metal oxide particles, temperatures, sparging rates, carbon nanotubes and carbon fibers, may be different from those described and used herein. Particular processing techniques, proportions, and operating parameters may be developed to enable the process to be optimized, yet still be within the scope of the invention. Additionally, feed rates of the various components are expected to be optimized for each type of refinery process employed.

The words "comprising" and "comprises" as used throughout the claims is interpreted "including but not limited to".

The present invention may suitably comprise, consist of or consist essentially of the elements disclosed and may be practiced in the absence of an element not disclosed. For instance, there may be provided a method for producing carbon nanotubes/fibers that consists essentially of or consists of sparging a gas through a liquid hydrocarbon in the presence of an effective amount of magnesium oxide particles at a temperature in a range of between about 70 to about 90° C. to produce carbon nanotubes/fibers.

In another non-limiting embodiment, there may be provided a method for producing carbon nano-tubes and/or carbon fibers that consists essentially of or consists of sparging carbon dioxide gas through a liquid crude oil in the presence of from about 10 to about 500,000 ppm of magnesium oxide particles, based on the liquid crude oil, at a temperature in a range of between about 70 to about 90° C. to produce carbon nano-tubes and carbon fibers, where the magnesium oxide particles have a particle size range of from about 2 nanometers to about 10 microns, where the amount of gas sparged through the liquid crude oil based on the liquid crude oil ranges from about 0.1 to about 10 volume %.

What is claimed is:

1. A method for producing carbon nanotubes and/or carbon fibers comprising:
   sparging a gas through a liquid hydrocarbon in the presence of an effective amount of magnesium oxide particles at a temperature in a range of between about 70 to about 90° C. to produce carbon nanotubes and/or fibers.

2. The method of claim 1 where the gas is selected from the group consisting of carbon dioxide, argon, and mixtures thereof.

3. The method of claim 1 where the liquid hydrocarbon is crude oil.

4. The method of claim 1 where the effective amount of magnesium oxide particles concentration ranges from 50 ppm to 10 wt % MgO.

5. The method of claim 1 where the magnesium oxide particles have a particle size range of from about 2 nanometers to about 10 microns.

6. The method of claim 1 where the magnesium oxide particles are present in a bimodal particle size distribution where the magnesium oxide particles have an average particle size between about 90 nm to about 5 microns, where the amount of the magnesium oxide particles of a size less than 1000 nm is more than the amount of magnesium oxide particles of a size of 1 micron or greater.

7. The method of claim 1 where the amount of gas sparged through the liquid hydrocarbon based on the liquid hydrocarbon ranges from about 0.1 to about 10 volume %.

8. The method of claim 1 where the sizes of the carbon nanotubes and/or carbon fibers range from about 50 nm to about 20 microns.

9. A method for producing carbon nanotubes and/or carbon fibers comprising:
   sparging carbon dioxide gas through a liquid hydrocarbon in the presence of from about 10 to about 500,000 ppm of magnesium oxide particles, based on the liquid hydrocarbon, at a temperature in a range of between about 70 to about 90° C. to produce carbon nanotubes and/or fibers.

10. The method of claim 9 where the liquid hydrocarbon is crude oil.

11. The method of claim 9 where the magnesium oxide particles have a particle size range of from about 2 nanometers to about 10 microns.

12. The method of claim 9 where the magnesium oxide particles are present in a bimodal particle size distribution where the magnesium oxide particles have an average particle size between about 90 nm to about 5 microns, where the amount of the magnesium oxide particles of a size less than 1000 nm is more than the amount of magnesium oxide particles of a size of 1 micron or greater.

13. The method of claim 9 where the amount of gas sparged through the liquid hydrocarbon based on the liquid hydrocarbon ranges from about 0.1 to about 10 volume %.

14. The method of claim 9 where the sizes of the carbon tubes and/or carbon fibers range from about 50 nm to about 20 microns.

15. The method of claim 9 where the amount of nanoparticles present range from about 50 to about 1000 ppm, based on the liquid hydrocarbon.

16. A method for producing carbon nanotubes and/or carbon fibers comprising:

sparging carbon dioxide gas through a liquid crude oil in the presence of from about 10 to about 500,000 ppm of magnesium oxide particles, based on the liquid crude oil, at a temperature in a range of between about 70 to about 90° C. to produce carbon nanotubes and/or carbon fibers, where the magnesium oxide particles have a particle size range of from about 2 nanometers to about 10 microns, where the amount of gas sparged through the liquid crude oil based on the liquid crude oil ranges from about 0.1 to about 10 volume %.

17. The method of claim 16 where the magnesium oxide particles are present in a bimodal particle size distribution where the magnesium oxide particles have an average particle size between about 90 nm to about 5 microns, where the amount of the magnesium oxide particles of a size less than 1000 nm is more than the amount of magnesium oxide particles of a size of 1 micron or greater.

18. The method of claim 16 where the amount of nanoparticles present range from about 50 to about 1000 ppm.

19. The method of claim 16 where the sizes of the carbon nanotubes and/or carbon fibers range from about 50 nm to about 20 microns.

\* \* \* \* \*